US011246025B1

(12) United States Patent
Mohan Raj et al.

(10) Patent No.: US 11,246,025 B1
(45) Date of Patent: Feb. 8, 2022

(54) METHODS, SYSTEMS, AND COMPUTER READABLE MEDIA FOR SUPPORTING A MIGRATION OF USER PROFILE AND POLICY INFORMATION

(71) Applicant: Oracle International Corporation, Redwood Shores, CA (US)

(72) Inventors: John Nirmal Mohan Raj, Bangalore (IN); Srikar Doddi, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/027,640

(22) Filed: Sep. 21, 2020

(51) Int. Cl.
| | | |
|---|---|---|
| *H04L 29/08* | (2006.01) | |
| *H04W 8/20* | (2009.01) | |
| *H04W 60/04* | (2009.01) | |
| *H04W 4/50* | (2018.01) | |

(52) U.S. Cl.
CPC .............. *H04W 8/20* (2013.01); *H04W 4/50* (2018.02); *H04W 60/04* (2013.01)

(58) Field of Classification Search
None
See application file for complete search history.

(56) References Cited

U.S. PATENT DOCUMENTS

| 2019/0058997 A1* | 2/2019 | Futaki .................. H04W 16/02 |
|---|---|---|
| 2019/0110329 A1* | 4/2019 | Tang ....................... H04L 41/08 |

FOREIGN PATENT DOCUMENTS

| CN | 108347748 A | 7/2018 | |
|---|---|---|---|
| EP | 2244440 A1 * | 10/2010 | ........... G06F 9/4451 |
| EP | 3 697 116 A1 | 8/2018 | |
| WO | WO 03/053088 A1 | 6/2003 | |

OTHER PUBLICATIONS

Notification of Transmittal of International Search Report and the Written Opinion of the International Searching Authority, or the Declaration for International Application No. PCT/US2021/024972 (dated Jun. 29, 2021).
Keller et al., "5G Migration Strategy; From EPS to 5G System," Ericsson Technology Review, pp. 1-12 (2020).

* cited by examiner

*Primary Examiner* — Gary Lafontant
(74) *Attorney, Agent, or Firm* — Jenkins, Wilson, Taylor & Hunt, P.A.

(57) ABSTRACT

A method for supporting a migration of user profile and policy information includes receiving a 5G user profile addition request message associated with a subscriber entity, sending a user profile query message to a 4G subscription profile repository (SPR), determining that 4G user profile and policy information corresponding to the subscriber entity exists in the 4G SPR, and receiving 4G user profile and policy information corresponding to the subscriber entity from the 4G SPR and subsequently sending a 5G user profile creation message containing the 4G user profile and policy information to a 5G unified data repository (UDR) in response to determining that the 4G user profile and policy information is stored in the 4G SPR.

20 Claims, 8 Drawing Sheets

METHODS, SYSTEMS, AND COMPUTER READABLE MEDIA FOR SUPPORTING A MIGRATION OF USER PROFILE AND POLICY INFORMATION

TECHNICAL FIELD

The subject matter described herein relates to facilitating subscriber policy migrations in real-time. More particularly, the subject matter described herein relates to methods, systems, and computer readable media for supporting a migration of user profile and policy information.

BACKGROUND

The migration of subscribers operating in large mobile communications networks can present a number of implementation difficulties. Notably, network operator customers that opt to implement newer subscriber database technologies are typically presented with the challenge of migrating the user profiles and policies associated with an entire subscriber base onto the newer database technology. At present, the industry largely utilizes off-line migration model that involves the migration of a subset of subscribers onto the newer technology within a predefined window of time. As a result, the traditional methods of user profile data migration result in significant network downtime and subscriber discontinuity.

In some scenarios, when a mobile subscriber upgrades or changes the technology of their subscriber identity module (SIM) card (e.g., 4G SIM to 5G SIM), there is typically a delay before that subscriber can begin utilizing the new facilities. This delay is largely attributed to the amount of time required to conduct the off-line migration operation. In addition, the off-line migration of a unified data repository database considerably increases time for the new SIM card to obtain permission to utilize the new technology. Consequently, these factors present significant downtime scenarios when conducting an off-line migration scheme.

Accordingly, there exists a need for methods, systems, and computer readable media for supporting a migration of user profile and policy information.

SUMMARY

A method for supporting a migration of user profile and policy information includes receiving a 5G user profile addition request message associated with a subscriber entity, sending a user profile query message to a 4G subscription profile repository (SPR), determining that 4G user profile and policy information corresponding to the subscriber entity exists in the 4G SPR, and receiving 4G user profile and policy information corresponding to the subscriber entity from the 4G SPR and subsequently sending a 5G user profile creation message containing the 4G user profile and policy information to a 5G unified data repository (UDR) in response to determining that the 4G user profile and policy information is stored in the 4G SPR.

According to another aspect of the subject matter described herein, the method further includes sending a 5G user profile creation message containing user profile and policy data that is extracted from the 5G user profile addition request message to a 5G UDR in order to request provisioning of a 5G user profile corresponding to the subscriber entity if the 4G user profile and policy information is determined to not be stored in the 4G SPR According to another aspect of the subject matter described herein, the method further includes sending, to the 4G SPR, a user profile deletion request message of the 4G user profile and policy information stored in the 4G SPR after the 5G user profile based on the 4G user profile and policy information from the 4G SPR is provisioned in the 5G UDR.

According to another aspect of the subject matter described herein, the method further includes sending a new 5G user profile creation request message to the 5G UDR is in response to receiving a no user profile status message from the 4G SPR.

According to another aspect of the subject matter described herein, the method further includes sending a new 5G user profile addition response message to business and operations support system (BOSS) entity in response to receiving a user profile creation acknowledgment message from the 5G UDR.

According to another aspect of the subject matter described herein, a method wherein a policy and rules charging function (PCRF) entity is configured to direct a subscriber notification request (SNR) message to the 5G UDR for user profile and policy information in response to receiving a subscriber notification acknowledgment (SNA) message that indicates the 4G SPR does not contain any user profile and policy information for the subscriber entity.

According to another aspect of the subject matter described herein, a method wherein a protocol converter is configured to convert 5G data query messages sent from the 5G UDR to the 4G SPR and convert 4G data response messages sent by the 4G SPR to the 5G UDR.

According to another aspect of the subject matter described herein, a method wherein the 5G data query messages include representational state transfer (REST)/JavaScript object notation (JSON) formatted messages and the 4G data response messages include simple object access protocol (SOAP)/extensible markup language (XML) formatted messages.

In one embodiment, the disclosed subject matter includes a system for supporting a migration of user profile and policy information that comprises a 4G subscription profile repository configured to store 4G user profile and policy information corresponding to a plurality of 4G subscriber entities and a 5G unified data repository configured to store 5G user profile and policy information corresponding to a plurality of 5G subscriber entities. The system further includes a provisioning gateway that is configured to receive a 5G user profile addition request message associated with a subscriber entity, send a user profile query message to the 4G SPR, determine whether 4G user profile and policy information corresponding to the subscriber entity exists in the 4G SPR, and receive 4G user profile and policy information corresponding to the subscriber entity from the 4G SPR and subsequently sending a 5G user profile creation message containing the 4G user profile and policy information to the 5G UDR if the 4G user profile and policy information is determined to be stored in the 4G SPR.

According to another aspect of the subject matter described herein, a system wherein the provisioning gateway is further configured to send a 5G user profile creation message containing user profile and policy data that is extracted from the 5G user profile addition request message to a 5G UDR in order to request provisioning of a 5G user profile corresponding to the subscriber entity if the 4G user profile and policy information is determined to not be stored in the 4G SPR.

According to another aspect of the subject matter described herein, a system wherein the provisioning gateway is further configured to send, to the 4G SPR, a user profile deletion request message of the 4G user profile and policy information stored in the 4G SPR after the 5G user profile based on the 4G user profile and policy information from the 4G SPR is provisioned in the 5G UDR.

According to another aspect of the subject matter described herein, a system wherein the provisioning gateway is further configured to send a new 5G user profile creation request message to the 5G UDR in response to receiving a no user profile status message from the 4G SPR.

According to another aspect of the subject matter described herein, a system wherein the provisioning gateway is further configured to send a new 5G user profile addition response message to business and operations support system (BOSS) entity in response to receiving a user profile creation acknowledgment message from the 5G UDR.

According to another aspect of the subject matter described herein, a system wherein a policy and rules charging function (PCRF) entity is configured to direct a subscriber notification request (SNR) message to the 5G UDR for user profile and policy information in response to receiving a subscriber notification acknowledgment (SNA) message that indicates the 4G SPR does not contain any user profile and policy information for the subscriber entity.

According to another aspect of the subject matter described herein, a system wherein a protocol converter is configured to convert 5G data query messages sent from the 5G UDR to the 4G SPR and convert 4G data response messages sent by the 4G SPR to the 5G UDR.

According to another aspect of the subject matter described herein, a system wherein the 5G data query messages include representational state transfer (REST)/JavaScript object notation (JSON) formatted messages and the 4G data response messages include simple object access protocol (SOAP)/extensible markup language (XML) formatted messages.

The subject matter described herein may be implemented in hardware, software, firmware, or any combination thereof. As such, the terms "function" "node", "engine" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, "4G" refers to a fourth generation mobile network or a fourth generation cellular network as defined by the standards of the 3rd Generation Partnership Project (3GPP). Similarly, "5G" refers to a fifth generation mobile network or a fifth generation cellular network as defined by the standards of the 3GPP.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for supporting a migration of user profile and policy information. As used herein, user profile and policy information can include subscriber profile data, subscriber session data, and/or subscriber service data. Specifically, subscriber profile data can include such profile information corresponding to the subscriber entity (e.g., a user equipment (UE) subscriber, mobile device subscriber, etc.) including, but not limited to a mobile station international subscriber directory number (MSISDN), international mobile subscriber identity (IMSI), a user identifier, user location information, user billing information, and the like. Likewise, subscriber session data can include call session information such as a policy code, a user equipment type identifier, a session policy start date and time, a session policy end date and time, and the like. Moreover, subscriber service data may include call service information corresponding to the subscriber entity's allowed services, such as a service code, a service billing type, a service start date and time, a service and date and time, a service usage state, a service operation time, a service class identifier, and the like. Notably, the subscriber session data and the subscriber service data can be mapped to the subscriber profile data.

Figure 1:
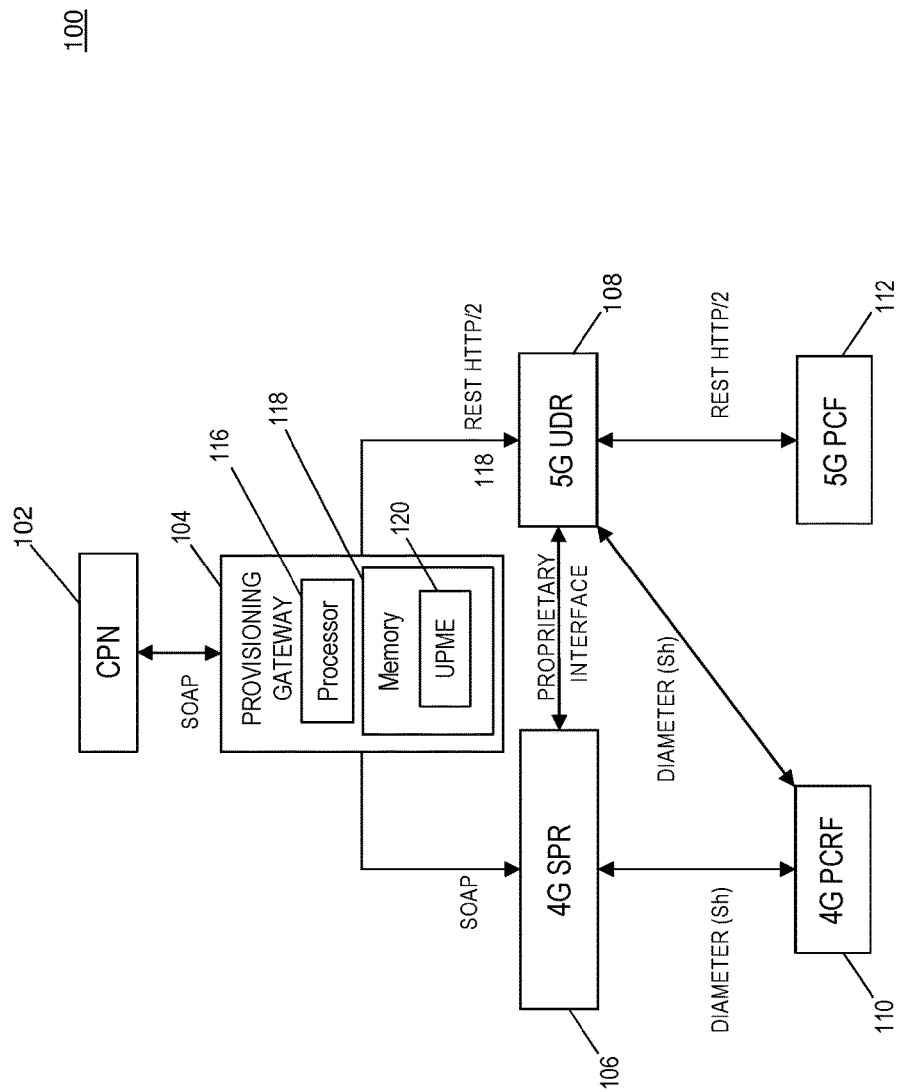
FIG. 1 is a block diagram illustrating an exemplary system architecture of a core network for supporting a migration of user profile and policy information according to an embodiment of the subject matter described herein.

FIG. 1 is a block diagram illustrating an exemplary system architecture corresponding to a core network for supporting a migration of user profile and policy information. The architecture depicted in FIG. 1 includes a customer premises network 102 that is communicatively connected to a provisioning gateway 104. For example, customer premises network 102 can communicate with provisioning gateway 104 using a simple object access protocol (SOAP) based interface or channel. In some embodiments, provisioning gateway 104 can be configured to host a user profile migration engine (UPME) 120 that is responsible for performing the actions described herein. For example, UPME 120 may be stored in memory 118 and executed by a hardware processor 116. As shown in FIG. 1, provisioning gateway 104 is communicatively connected to each of a 4th generation mobile network (4G) based subscription profile repository (SPR) 106 and a 5th generation mobile network (5G) unified data repository (UDR) 108. For example, provisioning gateway 104 may communicate with the 4G SPR 106 over a SOAP based interface via the communication of SOAP formatted messages. Similarly, provisioning gateway 104 can communicate with 5G based UDR 108 over a representational state transfer (REST) hypertext transfer protocol (HTTP) interface using REST HTTP formatted messages. Moreover, 4G SPR 106 and 5G UDR 108 can be configured to communicate directly with each other using a proprietary interface.

As shown in FIG. 1, 4G based SPR 106 can communicate with a 4G based PCRF 110 by communicating Diameter messages over a Diameter protocol interface (e.g., Sh interface). In a similar manner, 5G based UDR 108 communicates with a 5G based PCF 112 by communicating REST HTTP messages via a REST HTTP protocol interface. In addition, 5G based UDR 108 is configured to communicate directly with 4G based PCRF 110 over a Diameter Sh protocol. While the architecture and associated interface connections illustrated in FIG. 1 depicts one embodiment, other architectures and interfaces may be utilized without departing from the scope of the disclosed subject matter.

Figure 2:
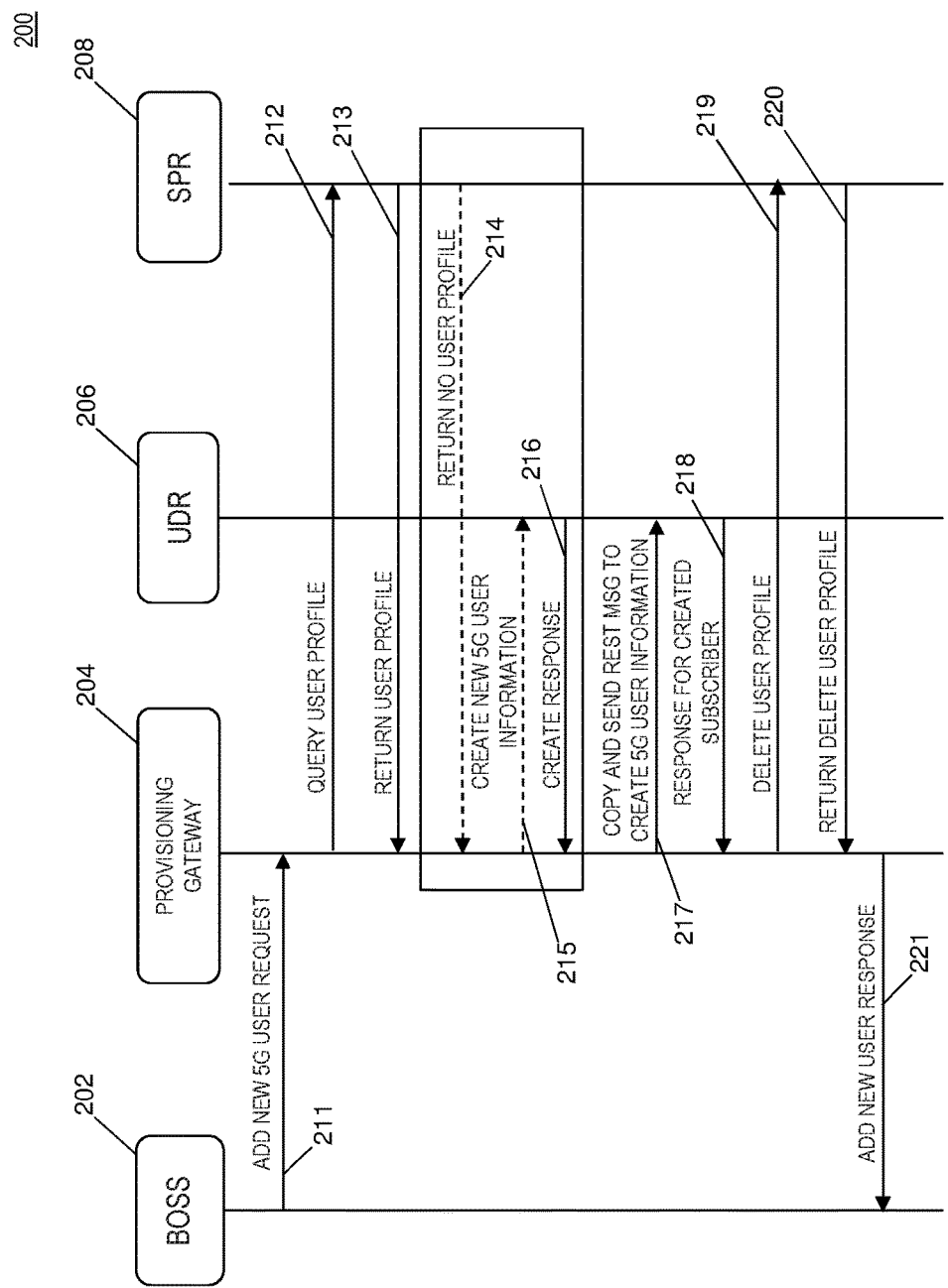
FIG. 2 is an exemplary signaling diagram of a migration of user profile and policy information according to an embodiment of the subject matter described herein.

FIG. 2 is an exemplary signaling diagram of a migration of user profile and policy information according to an embodiment of the subject matter described herein. More specifically, FIG. 2 illustrates an example solution for adding a 5G user profile for a mobile subscriber. In FIG. 2, a business and operations support system (BOSS) entity 202 that may reside in a CPN is configured to send a user profile addition request message 211 associated with a new 5G subscriber entity (e.g., a user equipment (UE) subscriber) to a provisioning gateway 204. As shown in FIG. 2, BOSS entity 202 is configured to directly communicate with provisioning gateway 204. Provisioning gateway 204 in turn is configured to communicate with a 4G SPR 208 and a 5G UDR 206. Notably, BOSS entity 202 is unaware of the communications that is conducted between the provisioning gateway 204, 4G SPR 208, and 5G UDR 206.

As described herein, 5G UDR 206 may comprise a 5G based converged repository that is used by other 5G network functions to store subscriber user profile and policy information. In some embodiments, 5G UDR 206 can be implemented as a cloud native function that offers a unified database for storing application, subscription, authentication, service authorization, policy data, session binding, application state information, and other types of information corresponding to a plurality of 5G subscriber entities. Specifically, 5G UDR 206 can be configured to facilitate the storage and retrieval of subscription data by a 5G unified data management (UDM) entity, facilitate the storage and retrieval of policy data of a 5G PCF, facilitate the storage and retrieval of structured data for exposure, and support application data (including packet flow descriptions for application detection) utilized by a 5G network exposure function (NEF).

As described herein, 4G SPR 208 can be a 4G based database repository that is accessible by other 4G network elements to store subscriber user profile and policy information. In some embodiments, 4G SPR 208 can be implemented as an on-premises component that affords database functionality for storing application, subscription, authentication, service authorization, policy data, session binding, application state information, and other types of information corresponding to a plurality of 4G subscriber entities. Moreover, 4G SPR 208 contains subscriber state (e.g., active, inactive, etc.) and Quality of service (QoS) associated with 4G subscriber entities.

Returning to the signaling depicted in FIG. 1, user profile addition request message 211 sent by BOSS may comprise a SOAP message or an HTTP GET message. In other embodiments, the user profile addition request message 211 received by the provisioning gateway 204 can be any message of any protocol that requests the addition of a new 5G user profile in a 5G based UDR. Notably, the following steps described herein can be performed by a UPME application (and/or the UPME 120 as shown in FIG. 1) that is stored in memory and executed by a processor of provisioning gateway 204. In addition, other network elements, such as UDR 206, can be provisioned with a client application that communicates directly with UPME 120. In some embodiments, the client application can be stored in memory of the UDR and executed by a processor.

In response to receiving user profile addition request message 211, the provisioning gateway 204 may send a user profile query message 212 to a 4G based SPR. At this stage, provisioning gateway 204 is attempting to determine if the subscriber entity is an existing 4G subscriber whose profile and policy information is stored in a 4G SPR. In some embodiment, the user profile query message 212 sent to 4G SPR 208 is a SOAP based request message. Alternatively, the user profile query message 212 that is sent by the provisioning gateway 204 can be any query message in any protocol that queries the 4G based SPR 208 and requests the subscriber entity's user profile and any other user related information (e.g., policies or subscriptions associated with the subscriber entity).

After sending the user profile query message 212 to the SPR 208, the provisioning gateway 204 may receive a user profile information response message 213 if the subscriber entity's user profile and policy information was located by SPR 208. Notably, user profile information response message 213 is sent by SPR 208 and may include user profile and user information that was previously stored in the SPR 208 (if the subscriber entity was an existing 4G subscriber). In some embodiments, user profile information response message 213 can comprise a SOAP response message that serves as a notification message that the subscriber entity was an existing 4G subscriber and further includes the relevant user profile and policy information for the subscriber entity. In other embodiments, user profile information response message 213 can be a message of any protocol that is recognized by provisioning gateway 204.

In response to receiving user profile information response message 213, provisioning gateway 204 extracts and copies the user profile and policy information contained in the user profile addition request message 211 and subsequently generates a new user profile creation request message 217. Provisioning gateway 204 then sends the new user profile creation request message 217 containing the user profile and policy information acquired from 4G SPR 208 to UDR 206. In some embodiments, user profile creation request message 217 comprises a REST/HTTP message that containing the subscriber entity's 4G user profile and policy information. Upon receiving user profile creation request message 217, UDR 206 utilizes the 4G user profile and policy information contained in message 217 (and originally included in response message 213) to create a 5G user profile entry that is subsequently stored in UDR 206. UDR 206 then sends a user profile creation acknowledgment message 218 to provisioning gateway 204 after the new 5G user profile entry is generated and stored. Notably, user profile creation acknowledgment message 218 can be a REST/HTTP response message that serves to notify the provisioning gateway 204 that a 5G user profile has been created for the subscriber entity. In response to receiving acknowledgment message 218, provisioning gateway 204 generates and sends a user profile deletion message 219 to SPR 208. In some embodiments, user profile deletion message 219 is a SOAP message that directs the SPR 208 to delete the locally stored 4G user profile corresponding to the subscriber entity. Upon deleting the 4G user profile, SPR 208 sends a user profile deletion acknowledgment message 220 to provisioning gateway 204. In some embodiments, user profile deletion acknowledgment message 220 is a SOAP message or any other message format that is recognized by provisioning gateway 204 and serves as a notification that the relevant 4G user profile has been removed from the 4G SPR 208.

After provisioning gateway 204 receives user profile deletion acknowledgment message 220 from SPR 208, provisioning gateway 204 sends a new user addition notification message 221, which indicates that a 5G user profile has been created for the subscriber entity, to BOSS entity 202. In some embodiments, user addition notification message 221 is a SOAP message or any other message format that is recognized by BOSS entity 202.

In some embodiments, 4G SPR 208 does not contain the user profile information corresponding to the subscriber entity as requested by the user profile query message 212 sent by provisioning gateway 204. In such a scenario where SPR 208 does not possess 4G user profile or policy information associated with the subscriber entity, SPR 208 can be configured to generate and send a notification message 214 that indicates that the subscriber entity's 4G user profile is unavailable and/or is not stored (i.e., absent) at SPR 208. In some embodiments, notification message 214 may be a SOAP message or any other response message of any protocol that is used by SPR 208 to indicate that there are no user profiles or policies associated with the subscriber entity stored at the SPR 208.

After receiving notification message 214 from SPR 208, provisioning gateway 204 thereby determines that there is no 4G user profile for the subscriber entity. In response to this determination, provisioning gateway 204 generates and sends a new 5G user profile creation request message 215 to 5G UDR 206. In some embodiments, user profile creation request message 215 is a REST/HTTP message that includes user profile and policy information originally received in message 211 from BOSS entity 202. In other embodiments, user profile creation request message 215 can be any message that is recognized by 5G UDR 206 and that requests the creation of a new 5G user profile. In response to receiving user profile creation request message 215, UDR 206 generates and sends a user profile creation acknowledgment response message 216 to provisioning gateway 204. In some embodiments, user profile creation acknowledgment response message 216 is a REST/HTTP message that serves to notify provisioning gateway 204 that a 5G user profile has been generated and is stored by UDR 206. In response to receiving message 216, provisioning gateway 204 proceeds by sending a new user addition notification message 221, which indicates that a new 5G user profile has been created for the subscriber entity, to BOSS entity 202. As indicated above, user addition notification message 221 may be a SOAP message or any other message format that is recognized by BOSS entity 202. Notably, BOSS entity 202 only communicates directly with provisioning gateway 204 and is unaware of the communications conducted among UDR 206, SPR 208, and provisioning gateway 204.

Figure 3:
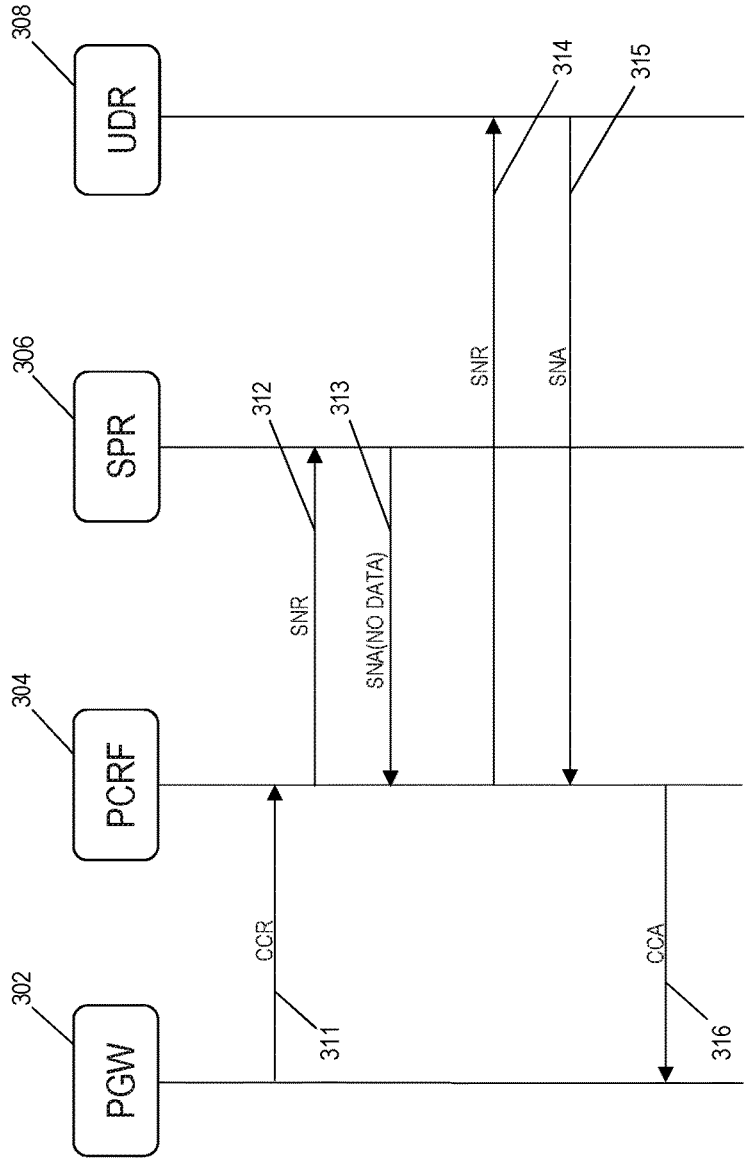
FIG. 3 is an exemplary signaling diagram involving a 5G subscriber entity that is attached to a 4G policy and charging rules function (PCRF) according to an embodiment of the subject matter described herein.

FIG. 3 is an exemplary signaling diagram involving a 5G subscriber entity that is attached to a 4G PCRF according to an embodiment of the subject matter described herein. Specifically, FIG. 3 depicts a flow diagram that illustrates the messaging that occurs when a subscriber entity that is already provisioned in the 5G UDR is subsequently attached to a 4G PCRF (e.g., network routing call flows can route the subscriber entity onto a PCRF). In such a scenario shown in FIG. 3, PGW 302 sends a Diameter credit control request (CCR) message 311 to 4G PCRF 304 in order to request policy rules and IP flow mobility routing rules for the subscriber entity. Notably, the subscriber entity is attached to PCRF 304 in the example illustrated in FIG. 3. In response to receiving the CCR message 311 from PGW 302, PCRF 304 is configured to send a Diameter subscribe-notifications-request (SNR) message 312 to 4G SPR 306. In some embodiments, SNR message 312 is used by PCRF 304 to request 4G user profile data that corresponds to the subscriber entity and is stored on 4G SPR 306. In this particular scenario, SPR 306 does not possess user profile and/or policy data associated with the 5G subscriber entity (e.g., the subscriber entity's user profile has already been migrated out from the 4G SPR 306). As a result, SPR 306 sends a subscribe-notifications-answer (SNA) message 313 that indicates that user profile data for the subscriber entity is not locally stored on (or has been deleted from) SPR 306. In some embodiments, PCRF 304 has been adapted with the configuration that will trigger a subsequent SNR message 314 in the event a "no user profile data" SNA message 313 is received from 4G SPR 306. Specifically, PCRF 304 has a configuration to attempt sending a new SNR message 314 to an alternative UDR (e.g., 5G UDR 308) in the event of receiving a failure response indicated by SNA message 313.

In response to receiving SNR message 314 from PCRF 304, 5G UDR 308 is configured to obtain user profile and policy information corresponding to the subscriber entity. UDR 308 is further configured to include the located user profile and policy information corresponding to the subscriber entity in a SNA message 315, which is sent to PCRF 304. In response, PCRF 304 extracts the user profile and policy information contained in message 315 and subsequently operates normally by executing its conventional functionality of the 4G network, Notably, the PCRF receives the 4G user profile and policy information in a format it understands.

Figure 4:
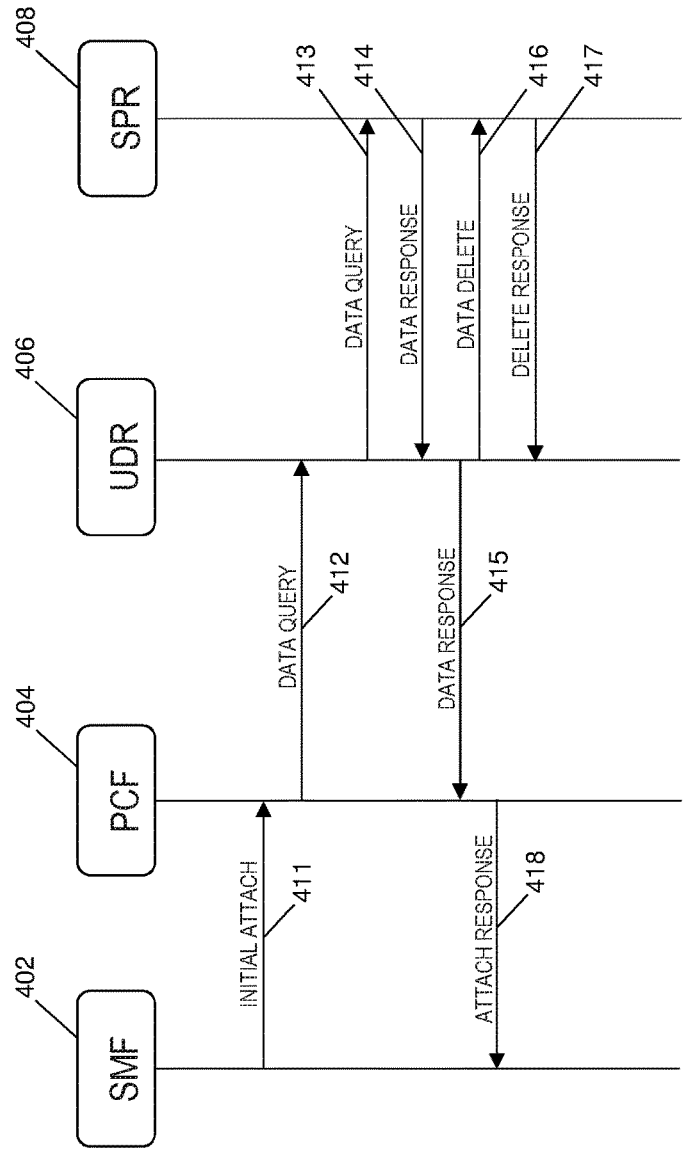
FIG. 4 is an exemplary signaling diagram involving a 4G subscriber entity that is attached to a 5G policy control function (PCF) according to an embodiment of the subject matter described herein.

FIG. 4 is an exemplary signaling diagram involving a 4G subscriber entity that is attached to a 5G PCF according to an embodiment of the subject matter described herein. For example, FIG. 4 illustrates the scenario where a subscriber entity can be a 4G subscriber that lands on a 5G PCF. As shown in FIG. 4, a session management function (SMF) 402 sends an initial attachment message 411 to a 5G PCF 404. In response to receiving message 411, PCF 404 sends a subscriber data query 412 to 5G UDR 406. In particular, subscriber data query 412 serves as a request for user profile and policy information pertaining to the subscriber entity. Further, subscriber data query 412 triggers the initiation of a user profile migration. Namely, in this example 5G UDR 406 does not presently possess the user profile and policy information of the 4G subscriber entity. In some embodiments, UDR 406 is configured with a client application that is adapted to generate and send a new user profile data query message 413 to 4G SPR 408 over a proprietary interface using a proprietary message protocol. Notably, UDR 406 is configured to request the user profile and policy information pertaining to the subscriber entity from 4G SPR 408 since UDR 406 does not possess the data. In response to receiving the user profile data query message 413, SPR 408 locates and subsequently sends the 4G user profile and policy information associated with the subscriber entity in a data response message 414. Specifically, SPR 408 sends data response message 414 to UDR 406 over the proprietary interface. Upon receiving data response message 414 from SPR 408, UDR 406 generates a new data response message 415 (i.e., a new message that is converted/translated to be understood by PCF 404). In response to receiving data response message 415, PCF 404 sends an attachment response message 418 that includes the subscriber entity's user profile and policy information to SMF 402.

In addition to sending data response message 415 to PCF 404, UDR 406 is configured to send a user profile deletion message 416 to SPR 408. In some embodiments, UDR 406 may utilize a proprietary interface to send a message 416 instructing SPR 408 to delete the stored user profile and policy information associated with the subscriber entity. In response to receiving user profile deletion message 416, SPR 408 proceeds with deleting the stored 4G user profile and policy information and subsequently sends a user profile deletion acknowledgement message 417 to UDR 406 over the proprietary interface. At this stage, 5G UDR 406 is now the data repository responsible for storing the user profile and policy information corresponding to the calling subscriber entity (e.g., user profile information is deleted from SPR 408).

Figure 5:
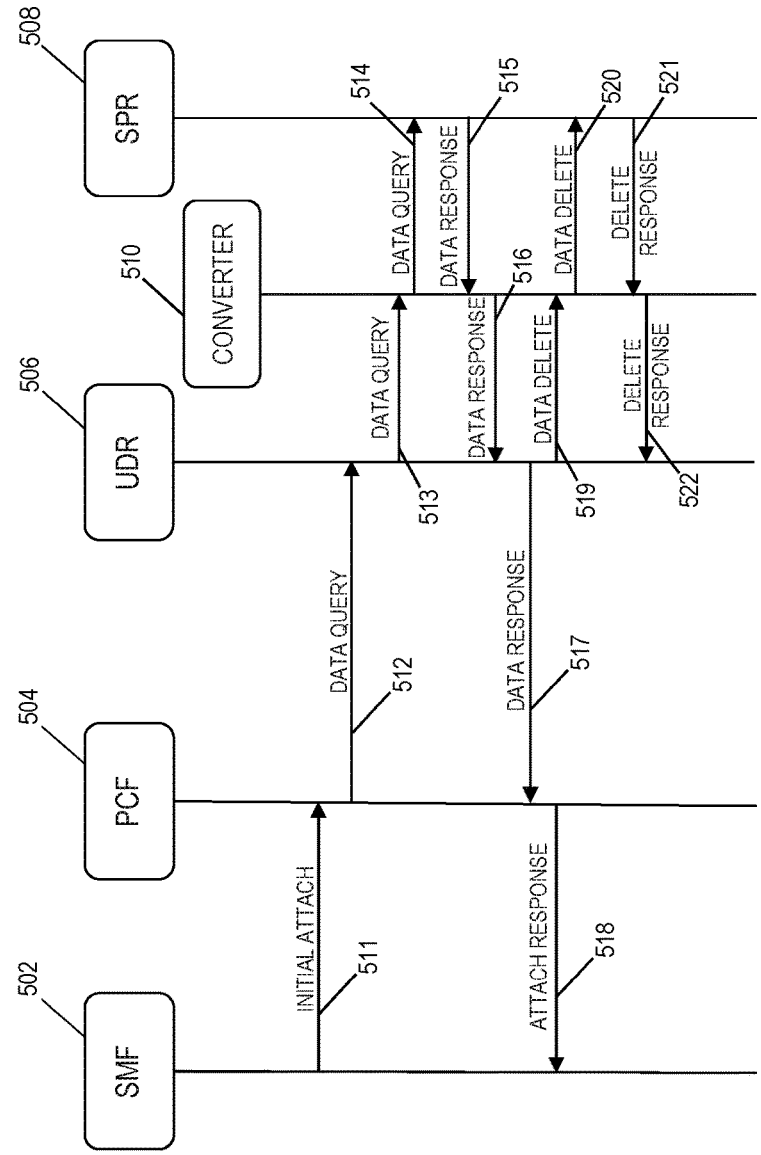
FIG. 5 is an exemplary signaling diagram involving a protocol converter that supports a 4G subscriber entity that is attached to a 5G PCF according to an embodiment of the subject matter described herein.

In some embodiments, modification may be required when a 4G SPR supports a standard SOAP/XML interface. In some embodiments, the disclosed subject matter involves an SPR that is configured with a provisioning interface that is compatible with an intermediary function, such as a protocol converter element. Such a configuration is depicted in FIG. 5, which illustrates the use of a protocol converter element 510 that is logically positioned in between 5G UDR 506 and 4G SPR 508. For example, protocol converter element 510 can be configured to convert messages received in a REST/JavaScript object notation (JSON) format into a SOAP/XML format, and vice versa. While protocol converter element 510 is described as converting REST/JSON messages to SOAP/XML messages, protocol converter element 510 can convert messages of other protocol formats without departing from the scope of the disclosed subject matter.

In some scenarios, a subscriber entity can be a 4G subscriber that attaches to a 5G PCF. This example is illustrated in the call signaling flow of FIG. 5. For example, a SMF 502 sends an initial attachment message 511 to a 5G PCF 504. In response to receiving attachment message 511, PCF 504 sends a subscriber data query 512 to 5G UDR 506. In particular, subscriber data query message 512 serves as a request for user profile and policy information pertaining to the subscriber entity. Further, subscriber data query message 512 triggers the initiation of a user profile migration (e.g., "migration on demand"). However, in this example. 5G UDR 506 does not presently possess the user profile and policy information of the 4G subscriber entity. In some embodiments, 5G UDR 506 is configured with a client application that is adapted to generate and send a user profile data query message 513 to 4G SPR 508 (via protocol converter element 510). In some embodiments, user profile data query message 513 is in the REST/JSON format and is directed towards the protocol converter element 510 since SPR 508 is configured to recognize SOAP/XML formatted messages. Notably, UDR 506 is configured to request the user profile and policy information pertaining to the subscriber entity from 4G SPR 408 (via protocol converter element 510) since UDR 506 does not possess the data.

Upon receiving the REST/JSON user profile data query message 513, protocol converter element 510 converts data query message 513 into a converted data query message 514. In some embodiments, data query message 514 is a SOAP/XML formatted message that is recognizable by SPR 508. SPR 508 then processes query message 514 received from protocol converter element 510 and obtains the requested user profile and policy information from its local database. Specifically, SPR 508 locates and subsequently sends the 4G user profile and policy information associated with the subscriber entity in a data response message 515 that is directed to UDR 506 via protocol converter element 510. In some embodiments, SPR 508 locates the stored 4G user profile and policy information using a user identifier, such as a MSISDN or mobile identity and/or specify policy name (e.g., which will be requested by the PCRF).

After receiving data response message 515, protocol converter element 510 can be configured to convert this SOAP/XML message into a REST/HTTP data response message 516 that is recognized by UDR 506. Upon receiving data response message 516 from protocol converter element 510, UDR 506 generates a new data response message 517. In response to receiving data response message 517, PCF 504 sends an attachment response message 518 that includes the subscriber entity's user profile and policy information to SMF 502.

In addition to sending data response message 517 to PCF 504, UDR 506 is configured to send a user profile deletion message 519 to SPR 508 via protocol converter element 510. Now that UDR 506 is responsible for locally storing the 5G user profile and policy information, 4G SPR 508 is no longer required to host the 4G user profile and policy data associated with the subscriber entity. In some embodiments, protocol converter element 510 receives the user profile deletion message 519 as a REST/JSON message and subsequently converts message 519 into a user profile deletion message 520, which is in the SOAP/XML format. Afterwards, protocol converter element 510 sends user profile deletion message 520 to SPR 508. Upon receiving user profile deletion message 520, SPR 508 is configured to locate and delete the user profile and policy information associated with the subscriber entity. As a result, the subscriber entity's user profile and policy information will only be stored at 5G UDR 506. After the 4G user profile and policy information is deleted, SPR 508 generates and directs a user profile deletion response message 521 to UDR 506. In some embodiments, user profile deletion response message 521 is a SOAP/XML message that serves as a deletion notification message that is initially received by protocol converter element 510. Protocol converter element 510 subsequently converts user profile deletion response message 521 into a converted user profile deletion response message 522. Notably, user profile deletion response message 522 can be a REST/JSON formatted message or any other message that is recognized by UDR 506.

Figure 6:
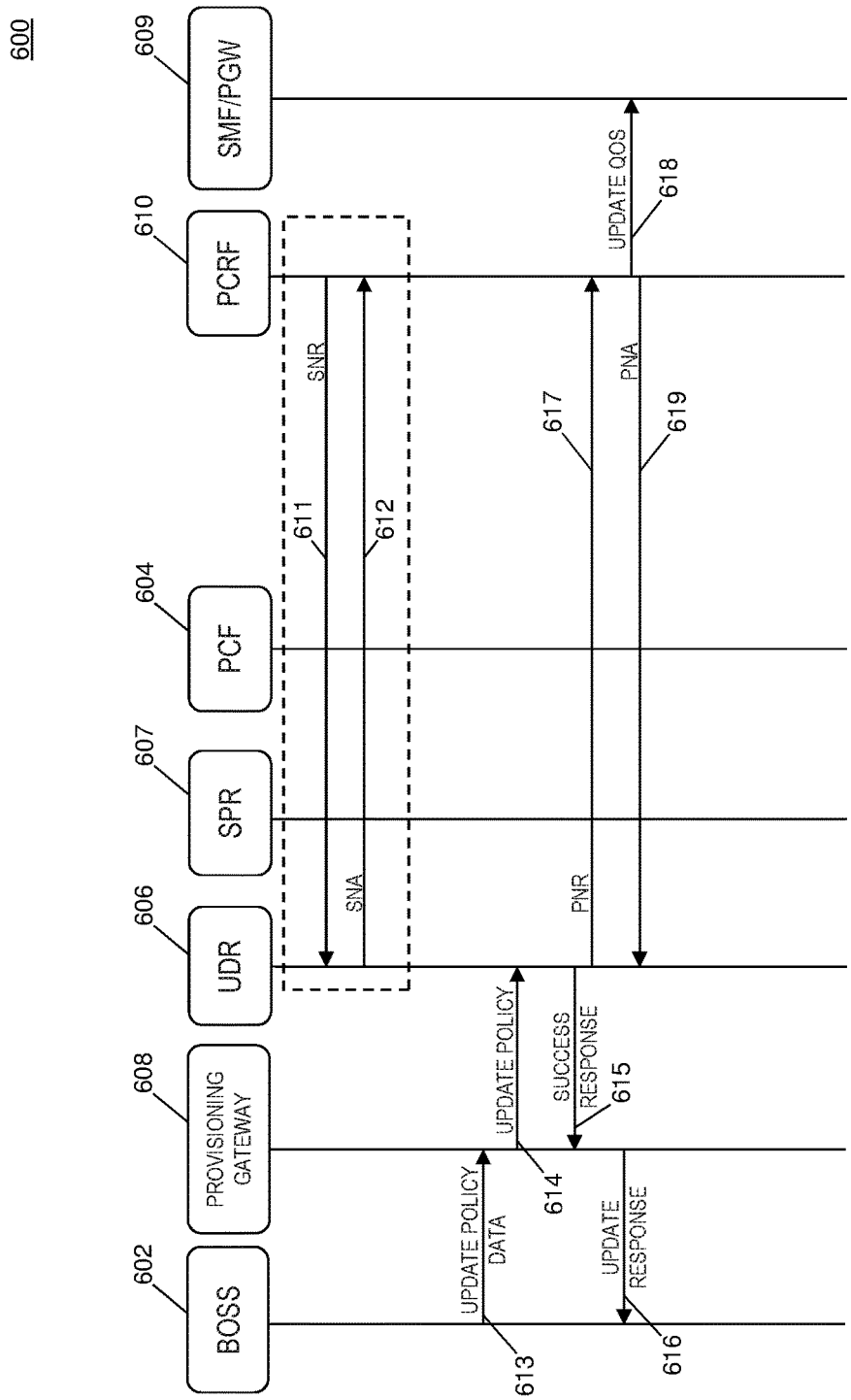
FIG. 6 is an exemplary signaling diagram demonstrating the updating of a subscriber entity's policy data status in a real-time migration according to an embodiment of the subject matter described herein.

FIG. 6 is an exemplary signaling diagram demonstrating the updating of a subscriber entity's policy data status in a real-time migration according to an embodiment of the subject matter described herein. Specifically, in FIG. 6 the subscriber entity is anchored at a 4G PCRF 610. Prior to any migration, PCRF 610 sends a Diameter SNR message 611 to 5G UDR 606 in order to request the updating of the user profile and policy information associated with the subscriber entity. In response, UDR 606 provides the requested user profile and policy information to PCRF 610 via a Diameter SNA message 609. This exchange of Diameter messages between UDR 606 and PCRF 610 is a precondition for obtaining notifications and updates about subscriber if policy data modifications corresponding to the subscriber entity.

In some embodiments, BOSS entity 602 subsequently sends a policy data update message 613 to provisioning gateway 608. In response, provisioning gateway 608 sends an update policy message 614 to 5G UDR 606. UDR 606 then sends a success response message 615 to notify provisioning gateway 608 that the subscriber's profile and/or policy data was updated successfully. Provisioning gateway 608 likewise sends an update policy message 616 to BOSS entity 602 in order to notify that the subscriber entity profile on UDR 606 has been updated. In some embodiments, message 616 may be an HTTP 200 OK success message. UDR 606 proceeds to send a Diameter push-notification-request (PNR) message 617. In some embodiments, Diameter PNR message 617 serves as a command to PCRF 610 in order to have PCRF 610 notify UDR 606 of any modifications made to the user profile and policy information stored in the PCRF. In response to receiving PNR message 617, PCRF 610 sends a quality of service (QoS) update request message 618 to the SMF/PGW 613. Further, PCRF 610 sends a push-notification-answer (PNA) message 619 to UDR 606.

Figure 7:
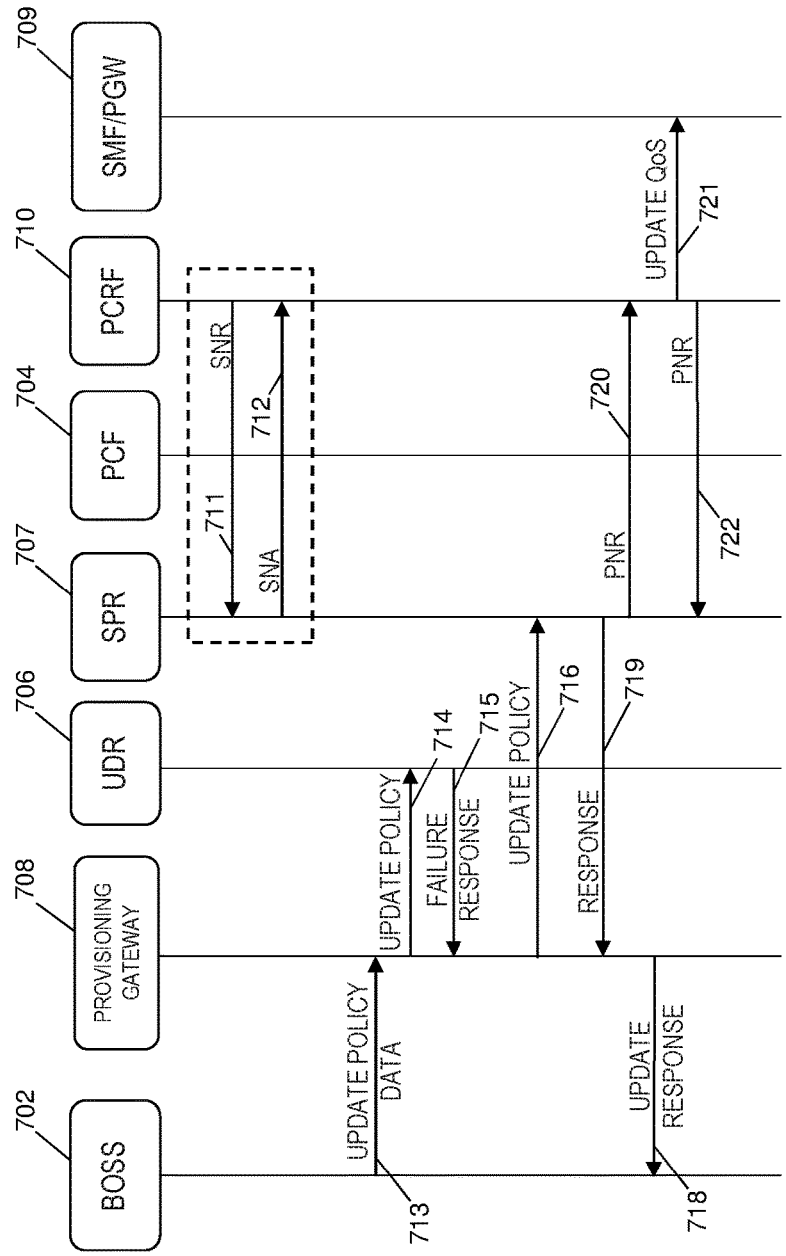
FIG. 7 is an exemplary signaling diagram demonstrating the updating of a 4G subscriber entity's policy data status in real-time according to an embodiment of the subject matter described herein.

FIG. 7 is an exemplary signaling diagram demonstrating the updating of a 4G subscriber entity's policy data status in real-time according to an embodiment of the subject matter described herein. Specifically, FIG. 7 depicts a signaling flow diagram that illustrates the updating of a 4G subscriber entity's policy and profile information in a real time (i.e., not a subscriber to 5G migration case). In FIG. 7, the subscriber is attached to a 4G network containing PCRF 710. Prior to any user profile update, PCRF 710 sends a Diameter SNR message 711 to 4G SPR 707 in order to request the updating of the user profile and policy information associated with the subscriber entity. In response, 4G SPR 707 provides the requested user profile and policy information to PCRF 710 via a Diameter SNA message 712. Notably, this exchange of Diameter messages between 4G SPR 707 and PCRF 710 is a precondition for obtaining notifications and updates about policy data modifications corresponding to the subscriber entity.

In some embodiments, a BOSS entity 702 sends a policy data update message 713 to the provisioning gateway 708. In response, provisioning gateway 708 sends an update policy message 714 to UDR 706. UDR 706 then sends a failure response message 715 to provisioning gateway 708 in order to notify that the subscriber's profile and/or policy was not present and/or not updated. Provisioning gateway 708 then sends an update policy request message 716 to SPR 707. In this scenario, update policy request message 716 serves as a request for user profile and policy information corresponding to the subscriber entity. In response to receiving update policy request message 716, SPR 707 sends a response message 717 including the subscriber entity's user profile and policy information to provisioning gateway 708. In response, provisioning gateway 708 sends an update response message 718 to BOSS entity 702.

In some embodiments, SPR 707 is further configured to send a Diameter push-notification-request (PNR) message 720 to PCRF 710. As such, a Diameter PNR message serves as a command to have PCRF 710 notify SPR 707 of any changes made to the user profile or policy information stored in the PCRF. In response to receiving PNR message 720, PCRF 710 sends a quality of service (QoS) update request message 721 to the SMF/PGW 709. Similarly, PCRF 710 sends a push-notification-answer (PNA) message 722 to SPR 707.

Figure 8:
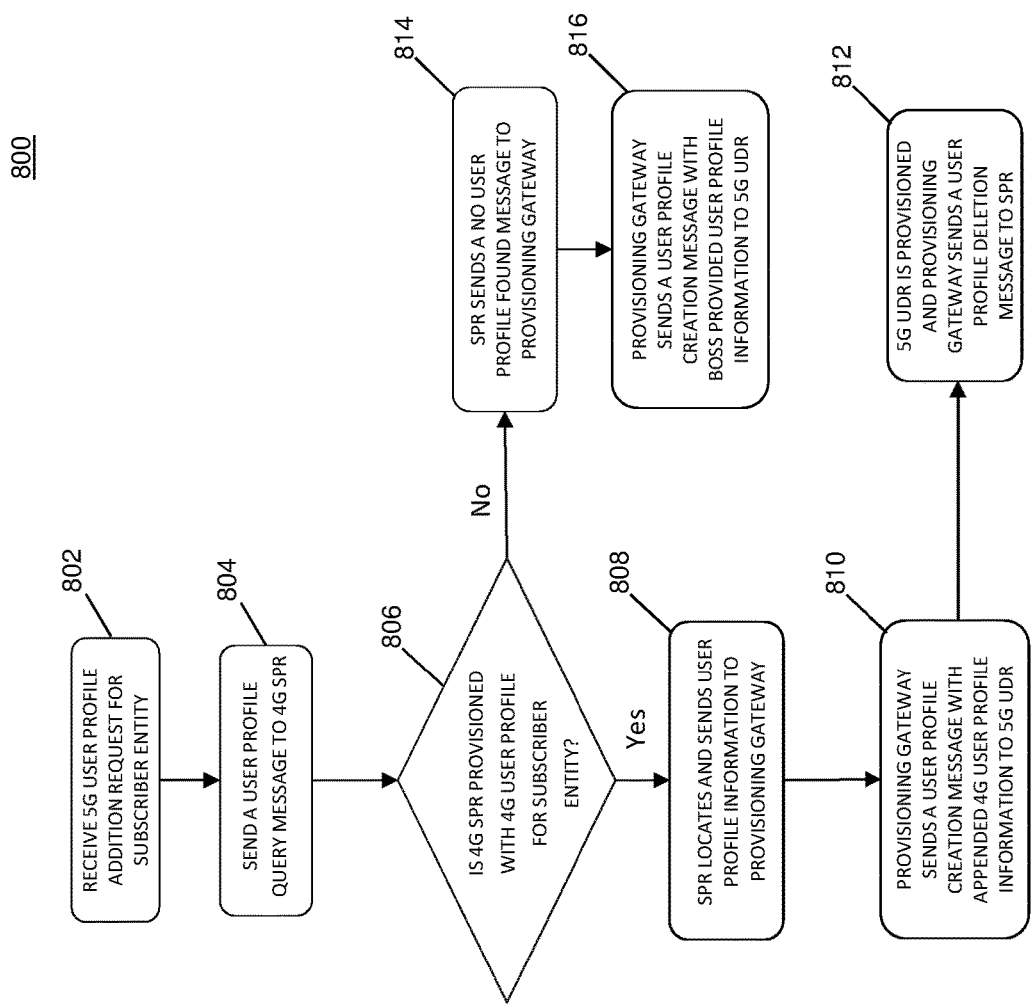
FIG. 8 is a flow chart illustrating an exemplary method for supporting a migration of user profile and policy information according to an embodiment of the subject matter described herein.

FIG. 8 is a flow chart illustrating an exemplary method for supporting a migration of user profile and policy information. In some embodiments, method 800 may include an algorithm and/or software process that is stored in memory of one or more of a provisioning gateway and/or a UDR and respectively executed by one or more hardware processors of the provisioning gateway and/or UDR (or a hardware based network element hosting and/or supporting the UDR).

In block 802, a user profile addition request message associated with a subscriber entity is received. In some embodiments, the user profile addition request message is received by provisioning gateway from a business and operations support system (BOSS) entity. In some embodiments, the user profile addition request message includes subscriber profile data, subscriber session data, and/or subscriber service data as described above.

In block 804, a user profile query message is sent to a 4G SPR. In some embodiments, the provisioning gateway sends a SOAP based user profile query message to a 4G SPR. Specifically, the provisioning gateway sends the user profile query message to determine whether the 4G SPR locally stores or contains any 4G related user profile and policy information associated with the subscriber entity.

In block 806, a determination is made as to whether the 4G SPR is provisioned with the 4G user profile and policy information (i.e., subscriber profile data, subscriber session data, or subscriber service data) for the subscriber entity. If the 4G SPR is provisioned with the requested 4G user profile and policy information, method 800 proceeds to block 808 where the SPR locates and sends user profile and policy information to the provisioning gateway. For example, the 4G SPR locates and appends any pertinent subscriber profile data, subscriber session data, or subscriber service data to a user profile response message. After constructing the user profile response message and appending the located user profile and policy information, the 4G SPR is configured to send the user profile response SOAP message to the provisioning gateway.

In block 810, a user profile creation message with the appended 4G user profile and policy information is sent to the 5G UDR. In some embodiments, the provisioning gateway appends the user profile and policy information received from the SPR in a REST/HTTP user profile creation message that is subsequently sent to the UDR.

In block 812, the 5G UDR is provisioned with the user profile policy information received from the provisioning gateway. Furthermore, the provisioning gateway is configured to send a user profile deletion message to the 4G SPR. Notably, the 4G SPR is configured to remove the 4G user profile and policy information associated with the subscriber entity upon receiving the user profile deletion SOAP message from the provisioning gateway.

Returning to block 806, if the 4G SPR is not provisioned with the requested 4G user profile and policy information associated with the subscriber entity, method 800 proceeds to block 814 where the 4G SPR sends a notification message to the provisioning gateway. For example, the 4G SPR sends a "no user profile found" notification SOAP message to the provisioning gateway that indicates that the 4G SPR was unable to locate and/or does not store the user profile and policy information associated with the subscriber entity.

In block 816, a user profile creation message containing user profile information originally obtained from the BOSS entity (see block 802) is created and sent. In particular, the provisioning gateway can be configured to generate a user profile creation message that includes the subscriber profile data, the subscriber session data, and or the subscriber service data that was originally received from the BOSS entity. The provisioning gateway may then subsequently send the user profile creation message to the 5G UDR. Since the provisioning gateway did not obtain any user profile information from 4G SPR, the provisioning gateway is responsible for creating a 5G user profile in the UDR utilizing the information it initially received from the BOSS entity. Notably, the provisioning gateway is responsible for creating or provisioning a 5G user profile using either pre-existing 4G user profile information that is stored in an SPR or from information provided by the BOSS entity. Moreover, the BOSS entity is completely unaware of the manner (i.e., communications with SPR and UDR) in which the provisioning gateway generates the 5G user profile in the UDR.

It will be appreciated that method 800 is for illustrative purposes and that different and/or additional actions may be used. It will also be appreciated that various actions described herein with regard to method 700 may occur in a different order or sequence.

It should be noted that the UPME, the provisioning gateway, and/or functionality described herein may constitute a special purpose computing device. Further, UPME 120, provisioning gateway 104, and/or functionality described herein can improve the technological field of network communications involving mobile devices (e.g., UE devices) by utilizing various techniques or mechanisms to facilitate the migration of subscriber policies in real time as opposed to previously utilized off-line user profile migration schemes. For example, the disclosed subject matter affords the technical advantage of providing techniques or mechanisms for conducting subscriber profile migration onto newer technology in such a manner that support time is reduced as well as the reduction in cost to a network operator due to the removal of elaborate migration preparations. Moreover, the disclosed subscriber migration technique is conducted in real-time and with minimal effect on the underlying network, thereby facilitating optimum network usage. Notably, network downtime and subscriber discontinuity can be avoided and/or largely eliminated.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for supporting a migration of user profile and policy information, the method comprising:
   receiving a fifth generation mobile network (5G) user profile addition request message associated with a subscriber entity;
   sending a user profile query message to a fourth generation mobile network (4G) subscription profile repository (SPR);
   determining that 4G user profile and policy information corresponding to the subscriber entity exists in the 4G SPR; and
   receiving 4G user profile and policy information corresponding to the subscriber entity from the 4G SPR and subsequently sending a 5G user profile creation message containing the 4G user profile and policy information to a 5G unified data repository (UDR) in response to determining that the 4G user profile and policy information is stored in the 4G SPR.

2. The method of claim 1 comprising sending a 5G user profile creation message containing user profile and policy data that is extracted from the 5G user profile addition request message to a 5G UDR in order to request provisioning of a 5G user profile corresponding to the subscriber entity if the 4G user profile and policy information is determined to not be stored in the 4G SPR.

3. The method of claim 1 comprising sending, to the 4G SPR, a user profile deletion request message of the 4G user profile and policy information stored in the 4G SPR after the 5G user profile based on the 4G user profile and policy information from the 4G SPR is provisioned in the 5G UDR.

4. The method of claim 1 comprising sending a new 5G user profile creation request message to the 5G UDR is in response to receiving a no user profile status message from the 4G SPR.

5. The method of claim 1 comprising sending a new 5G user profile addition response message to a (BOSS) entity in response to receiving a user profile creation acknowledgment message from the 5G UDR.

6. The method of claim 1 wherein a policy and rules charging function (PCRF) entity is configured to direct a subscriber notification request (SNR) message to the 5G UDR for user profile and policy information in response to receiving a subscriber notification acknowledgment (SNA) message that indicates the 4G SPR does not contain any user profile and policy information for the subscriber entity.

7. The method of claim 1 wherein a protocol converter is configured to convert 5G data query messages sent from the 5G UDR to the 4G SPR and convert 4G data response messages sent by the 4G SPR to the 5G UDR.

8. The method of claim 7 wherein the 5G data query messages include representational state transfer (REST)/ JavaScript object notation (JSON) formatted messages and the 4G data response messages include simple object access protocol (SOAP)/extensible markup language (XML) formatted messages.

9. A system for supporting a migration of user profile and policy information, the system comprising:
   a fourth generation mobile network (4G) subscription profile repository configured to store 4G user profile and policy information corresponding to a plurality of 4G subscriber entities;
   a fifth generation mobile network (5G) unified data repository configured to store 5G user profile and policy information corresponding to a plurality of 5G subscriber entities; and
   a provisioning gateway that is configured to receive a 5G user profile addition request message associated with a subscriber entity, send a user profile query message to the 4G SPR, determine that 4G user profile and policy information corresponding to the subscriber entity exists in the 4G SPR, and receive 4G user profile and policy information corresponding to the subscriber entity from the 4G SPR and subsequently sending a 5G user profile creation message containing the 4G user profile and policy information to a 5G unified data repository (UDR) in response to determining that the 4G user profile and policy information is stored in the 4G SPR.

10. The system of claim 9 wherein the provisioning gateway is further configured to send a 5G user profile creation message containing user profile and policy data that is extracted from the 5G user profile addition request message to a 5G UDR in order to request provisioning of a 5G user profile corresponding to the subscriber entity if the 4G user profile and policy information is determined to not be stored in the 4G SPR.

11. The system of claim 9 wherein the provisioning gateway is further configured to send, to the 4G SPR, a user profile deletion request message of the 4G user profile and policy information stored in the 4G SPR after the 5G user profile based on the 4G user profile and policy information from the 4G SPR is provisioned in the 5G UDR.

12. The system of claim 9 wherein the provisioning gateway is further configured to send a new 5G user profile creation request message to the 5G UDR in response to receiving a no user profile status message from the 4G SPR.

13. The system of claim 9 wherein the provisioning gateway is further configured to send a new 5G user profile addition response message to a business and operations support system (BOSS) entity in response to receiving a user profile creation acknowledgment message from the 5G UDR.

14. The system of claim 9 wherein a policy and rules charging function (PCRF) entity is configured to direct a subscriber notification request (SNR) message to the 5G UDR for user profile and policy information in response to receiving a subscriber notification acknowledgment (SNA) message that indicates the 4G SPR does not contain any user profile and policy information for the subscriber entity.

15. The system of claim 9 wherein a protocol converter is configured to convert 5G data query messages sent from the 5G UDR to the 4G SPR and convert 4G data response messages sent by the 4G SPR to the 5G UDR.

16. The system of claim 15 wherein the 5G data query messages include representational state transfer (REST)/JavaScript object notation (JSON) formatted messages and the 4G data response messages include simple object access protocol (SOAP)/extensible markup language (XML) formatted messages.

17. A non-transitory computer readable medium having stored thereon executable instructions that when executed by a processor of a computer control the computer to perform steps comprising:
receiving a fifth generation mobile network (5G) user profile addition request message associated with a subscriber entity;
sending a user profile query message to a fourth generation mobile network (4G) subscription profile repository (SPR);
determining that 4G user profile and policy information corresponding to the subscriber entity exists in the 4G SPR; and
receiving 4G user profile and policy information corresponding to the subscriber entity from the 4G SPR and subsequently sending a 5G user profile creation message containing the 4G user profile and policy information to a 5G unified data repository (UDR) in response to determining that the 4G user profile and policy information is stored in the 4G SPR.

18. The non-transitory computer readable medium of claim 17 comprising sending a 5G user profile creation message containing user profile and policy data that is extracted from the 5G user profile addition request message to a 5G UDR in order to request provisioning of a 5G user profile corresponding to the subscriber entity if the 4G user profile and policy information is determined to not be stored in the 4G SPR.

19. The non-transitory computer readable medium of claim 17 comprising sending, to the 4G SPR, a user profile deletion request message of the 4G user profile and policy information stored in the 4G SPR after the 5G user profile based on the 4G user profile and policy information from the 4G SPR is provisioned in the 5G UDR.

20. The non-transitory computer readable medium of claim 17 comprising sending a new 5G user profile creation request message to the 5G UDR is in response to receiving a no user profile status message from the 4G SPR.

* * * * *